June 20, 1967 I. M. CROLL 3,327,297

MAGNETIC MEMORY ELEMENT

Filed Nov. 7, 1963 2 Sheets-Sheet 1

INVENTOR
IAN M. CROLL

BY [signature]

ATTORNEY

United States Patent Office 3,327,297

Patented June 20, 1967

3,327,297

MAGNETIC MEMORY ELEMENT

Ian M. Croll, Pleasantville, N.Y., assignor to International Business Machines Corporation, New York, N.Y., a corporation of New York Filed Nov. 7, 1963, Ser. No. 322,134
6 Claims. (Cl. 340—174)

This invention relates to a magnetic thin film memory or logic element with induced circumferential orientation of the easy magnetic axis and its method of fabrication. More specifically, the invention relates to electrically insulated concentric conductors the outer conductor being coated with a magnetic thin film having an easy axis of magnetization in a circumferential direction.

The use of magnetic wires for nondestructive readout memories was originally proposed by Gianola in his article in the Journal of Applied Physics, 29, 849 (1958). However, it is not possible to obtain a uniform switching field at all radii in a solid magnetic wire. T. R. Long has described in his article in the Journal of Applied Physics, 31, 123S (1960) the use of a tubular geometry for the magnetic material by depositing a thin magnetic electroplate on a nonmagnetic wire.

The use of cylindrical, thin films to store binary digital data, has been described in United States Patent No. 3,031,648, issued Apr. 24, 1962, to H. E. Haber et al. and also in an article by R. M. Wolfe entitled, "A Cylindrical Thin Film Shift Register and Compatible Logic Circuitry," Conference on Ultrafast Computing Techniques, Lake Arrowhead, Calif. Aug. 7–10, 1962.

In the process of plating a conducting wire with magnetic material, a circumferential magnetic orientation is obtained by virtue of the magnet field associated with the passage of electrical current through the nonmagnetic wire during electrodeposition of the magnetic material. Due to the current used to obtain magnetic orientation and the ohmic resistance of the wire to be electroplated, a substantial potential difference exists along the length of the wire being electroplated which gives rise to a changing composition of the magnetic alloy being deposited since the composition of magnetic alloy is effected by the current density at which it is deposited. This variation in composition has a deleterious effect on the uniformity of magnetic properties of the depositing alloy. It is important to maintain constant uniform composition and thickness of the deposited magnetic film in order to obtain optimum switching characteristics when operated as element of a memory device.

It has been found that variations in composition and thickness due to the orienting current can be avoided by the use of separate conductors to carry the orienting field producing current and the plating current. Thus, a high current can be passed through the central conductor in order to obtain an orienting field without inducing a large potential drop along the concentric conductor upon which the magetic material is deposited. The separation of the conductors is accomplished by use of an insulating film between them. The use of two insulated concentric conductors has the additional advantage of providing separate drive and sense lines when used as a memory device in electronic computers and data processors.

It is an object of the invention to prepare magnetic thin film memory or logic elements.

It is another object of the invention to prepare magnetic thin film memory or logic elements with induced circumferential orientation of the easy axis.

Still another object of the invention is to prepare electrically insulated concentric conductors, the outer conductor being coated with a magnetic thin film having an easy axis of magnetization in a circumferential direction.

A further object of the invention is to provide a magnetic thin film memory or logic element having induced circumferential orientation of the easy magnetic axis.

A still further object of the invention is to provide electrically insulated concentric conductors having the outer conductor coated with a magnetic film having an easy axis of magnetization in a circumferential direction.

Further, still another object of the invention is to provide a cylindrical central conductor electrically insulated from a concentric conducting film upon which is deposited a concentric magnetic thin film.

The foregoing and other objects, features, and advantages of the invention will be apparent from the following more particular description of a preferred embodiment of the invention as illustrated in the accompanying drawings.

Figure 1:
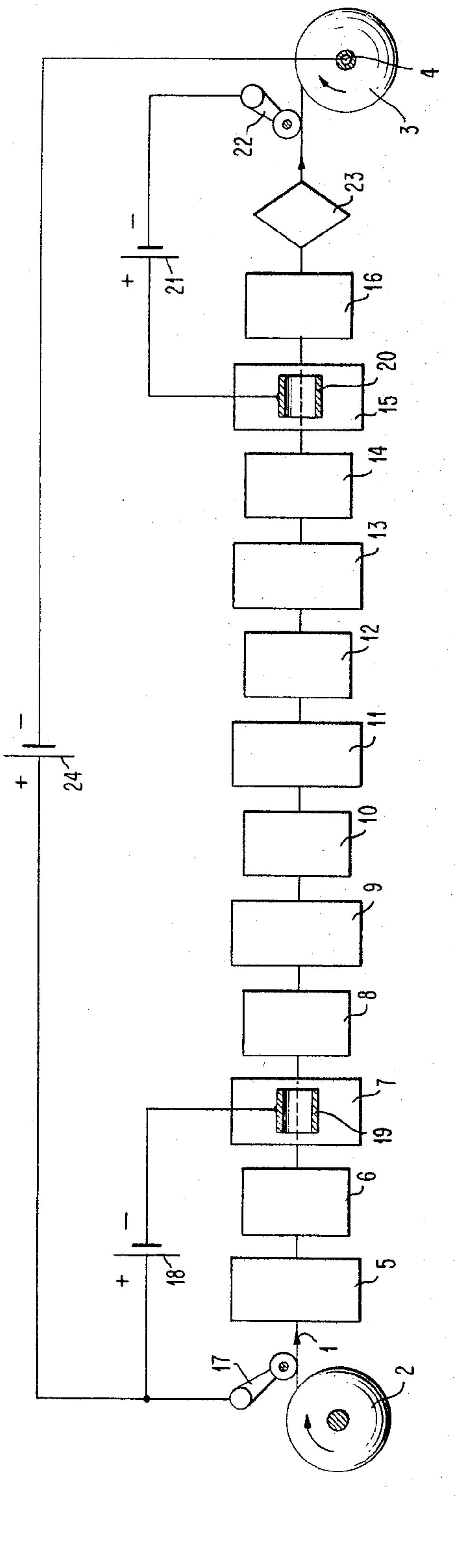
FIG. 1 is a diagram illustrating the continuous process used for preparing the magnetic member of the magnetic thin film memory or logic element.

This invention relates to a process for obtaining a cylindrical magnetic thin film of uniform composition and magnetic properties. The uniformity of magnetic material is obtained by the use of two concentric electrically insulated conductors. In the process of electroplating the magnetic material, the central conductor is used to pass the current required to induce magnetic anisotropy (orienting field current) and the outer conductor is used as the cathode for the plating process. By using a separate conductor to carry the plating current from that used to carry the orienting field current, a more uniform potential along the outer cathode surface and thus a more uniform current density and deposit composition are obtained over the outer cathode surface. The current required to produce an effective orienting field is much greater than that required to carry out plating. When the conductor used to carry the orienting field current is also used as the cathode, the potential drop along the wire due to the large orienting field current causes an uneven distribtuion of plating current at the cathode surface and a nonuniform composition results.

The present invention discloses a method of preparing a cylindrical magnetic thin film having uniform composition and magnetic properties with induced circumferential orientation of the easy magnetic axis. This method comprises using an electrically conductive wire (e.g., aluminum wire) as the central conductor, forming a high dielectric film on the surface of the central conductor (e.g., anodization, or coating with a high dielectric material such as glass) electrolessly depositing a nonferromagnetic conducting film on the adherent high dielectric film and then electrodepositing a Ni-Fe film on the electrolessly deposited electrically conductive nonferromagnetic film.

The aluminum base wire used in the process of the invention is of such quality that it will accept a dense uniform and continuous anodized coating from all of the anodizing electrolytes set forth hereinafter. Generally, it is preferred that the diameter of the wire be such that it is flexible and easily handled and not subject to breaking during the fabrication process (for example, it has been found that wires of diameters of approximately 5 mils to 20 mils can be conveniently used for this process).

The aluminum base wire is anodized by making the wire the anode in a cell containing an anodizing electrolyte. Although almost any nonalkaline aqueous electrolyte can be used to achieve anodization, this invention is limited to those which can be controlled so that a dense, uniform and continuous high dielectric anodic film is formed. Generally, aqueous electrolytes of sulfamic acid, sulfuric acid, phosphoric acid, chromic acid, oxalic acid, boric acid, and mixtures thereof are operable. However, the preferred electrolytes for producing the best dense, uniform and continuous high dielectric anodic film with the widest choice of operating parameters are those containing oxalic acid or boric acid and mixtures thereof. This dense, uniform and continuous high dielectric anodic film guarantees that no shorting contacts exist between the aluminum base wire and the subsequently electrolessly deposited electrically conductive nonferromagnetic film.

Now an adherent electrically conductive nonferromagnetic film (for example, Ni, Cu, Au or other noble metals known to be electrolessly depositable) is deposited on the above-described anodic film (i.e., the dense, uniform and continuous high dielectric anodic film). This deposition is accomplished electrolessly on the suitably sensitized high dielectric anodic film. The preferred method for producing this adherent electrically conductive nonferromagnetic film is by the electroless deposition of nickel from an acid electrolyte (as shown in "Symposium on Electroless Nickel Plating" (ASTM Special Technical Publication No. 265, November 1959)). Alternatively, this adherent electrically conductive nonferromagnetic film is deposited from an electroless copper solution (such as shown in Metal Finishing Guidebook Directory, 29th edition, 1961, page 444). Electrolessly deposited conductive films are preferred because they are wet processes compatible with the other wet processes of this invention for use in a continuous fabrication line and can be deposited on a nonconducting surface. As deposited, these electroless films are active and thus are hospitable surfaces for the subsequent deposition of metal films.

Next, a ferromagnetic nickel-iron alloy of preferably a nonmagnetostrictive composition (81% Ni-19% Fe by weight) is deposited on the surface of the previously electrolessly deposited electrically conductive nonferromagnetic film. Deposition of the Ni-Fe alloy can be carried out by well-known electroplating processes such as, for example, as described by I. W. Wolf and V. P. McConnell, "Proceedings, American Electroplaters' Soc." 215 (1956); IBM Technical Disclosure Bulletin, vol. 3, No. 2, July 1960, page 63, "Electrodeposition of Ni-Fe Films," B. I. Bertelson and E. R. York. Thickness of the deposited Ni-Fe film can be from 10,000 A. to 25,000 A., but for the purposes of this invention a thickness of 10,000 A. is preferred.

Suitable rinsing with water after each of the electrochemical process steps is carried out. The aluminum base wire is cleaned and rinsed prior to the anodization step.

The fabrication technique employed in the process of the invention can best be described in conjunction with FIG. 1.

Aluminum base wire 1 from supply spool 2 is drawn through the various stations of the process to take-up spool 3 which is made of a nonelectrically conducting material. Electrical contact with the untreated end of the aluminum wire is made with a terminal 4 on the take-up spool. The terminal 4 also serves to anchor the wire to take-up spool. The wire is then drawn through the stations of the process by rotating the take-up spool driven by a constant speed motor. The supply spool is maintained at a constant tension by standard techniques. The wire is drawn sequentially through the process stations comprising: cleaning station 5, rinse 6, anodizing station 7, rinse 8, first sensitizing station ($SnCl_2$) 9, rinse 10, second sensitizing station ($PdCl_2$) 11, rinse 12, electroless deposition station 13, rinse 14, electroplating station 15, rinse 16. Stations 5, 6, 7, and 8 are filled with suitable baths which perform the functions indicated above and the baths are continuously recirculated from reservoirs. A rolling electrical contact 17 is made to the wire immediately after leaving the supply spool. The electrical circuit is completed through a power supply 18 to the cathode 19 in the anodizing station such that the cathode is negative with respect to the wire to be anodized. When the anodized wire reaches the take-up spool, a flexible sheet of dielectric material (e.g., polyethylene terephthalate) is wrapped around the spool so as to electrically isolate the initial unanodized wire from the anodized wire. This step is necessary to prevent electrical shorting between the initially unanodized wire and the conducting film to be plated on the surface of the wire to follow. Now stations 8, 9, 10, 11, 12, 13, 14, 15, and 16 are filled with suitable baths which perform the functions indicated above and the baths are continuously recirculated from reservoirs.

Electrical contact is made from an anode 20 in electroplating station 15 through a power supply 21 to the wire by means of a rolling electrical contact 22 to provide the plating current for the deposition of the magnetic film. The connection is made in such a manner that the anode is positive with respect to the surface of the wire to be plated.

Upon leaving rinse station 16, the plated wire is dried by forced warm air from dryer 23.

Electrical contact is made from terminal 4 to the aluminum base wire 1 at rolling contact 17 through a power supply 24 in such a manner that the rolling contact 17 is positive with respect to terminal 4. The resulting circuit provides the orienting field current during the magnetic plating carried out at station 15.

The fluids are retained in the various stations of the process by means of capillary action at narrow orifices provided for passage of the wire through the stations. The anode in the electroplating station and the cathode in the anodizing station are cylindrical and concentric with the aluminum base wire.

The length of the wire plated for a given run is limited by the resistance of the total length of the wire and the voltage available to provide the desired orienting field current. Generally, several hundred feet of wire (e.g., 100–200 feet) are processed as a single run.

The magnetic member of the magnetic thin film memory or logic element of this invention is produced as delineated below. Since this process is a continuous one, the speed of operation is a constant for any given run. Hence, varying the parameters of treatment in any one station can only be carried out by increasing the length of wire in the station, by cascading, or increasing the size of the processing container, or by varying current or temperature at any given station. Thus, it will be obvious to those skilled in the art, that various changes in wire speed, tank length, temperature, concentration, current, etc., can be made.

*Example 1*

An aluminum base wire 5 mils in diameter and about 150 feet long is threaded into the machine schematically shown in FIG. 1 and the circumferential orienting field necessary for the deposition of the circumferentially oriented Ni-Fe magnetic film is produced by passing a current of one ampere through the aluminum base wire. The aluminum wire is cleaned for 90 seconds in station 5 in an alkaline soak cleaner comprising tri-sodium phosphate—45 gm./l. and sodium silicate—15 gm./l. in water, maintained at a temperature of 70° C. Any commercially available alkaline aluminum soak cleaner may also be used. After a 30 second overflow water rinse, the aluminum surface is anodized as follows: The aluminum base wire is made the anode in the anodizing acid solution, which comprises boric acid—90 gm./l. and 2 gm./l. of borax in water. This solution is maintained at 95° C. and the anodizing voltage is 250 volts for a treatment time of 90 seconds. Again, the wire (now surface anodized) is rinsed for 30 seconds in an overflow water rinse. The high dielectric anodic film is next sensitized by passing for 30 seconds through a solution of 30 gm./l.

$SnCl_2 \cdot 2H_2O$ maintained at 25° C. and containing sufficient HCl to achieve a pH of 1.0 followed by a 15 second water rinse; then for 30 seconds through a solution of $PdCl_2$, 0.1 gm./l. containing sufficient HCl to maintain a pH of 1.0 and maintained at 25° C.; followed by a 15 second water rinse. The now sensitized high dielectric anodic surface is made electrically conductive by electrolessly depositing nickel thereon by treating for 90 seconds in the following solution at a temperature of 99° C. and pH=5.0:

| | |
|---|---|
| $NiCl_2 \cdot 6H_2O$ ____ gm./l. | 24 |
| $NaH_2PO_2 \cdot H_2O$ ____ gm./l. | 24 |
| Sodium acetate ____ gm./l. | 16 |
| $Pb^{++}$ ____ p.p.m. | 4 |

After going through a water rinse for 15 seconds, the final film (that is, the Ni-Fe alloy) is electroplated onto the nonferromagnetic electrically conductive film by treating for 90 seconds at a temperature of 62° C. and a current density of 60 ma./cm.$^2$ in the following bath at pH=3.0:

| | Gm./l. |
|---|---|
| Nickel sulfamate | 180 |
| Ferrous sulfamate | 3 |
| Boric acid | 30 |
| Sodium lauryl sulfate | 1.2 |
| Sodium saccharin | 0.8 |

The product is then rinsed for 30 seconds in a water rinse and dried in station 23 and then taken up on the take-up reel 3, as shown in FIG. 1.

*Example 2*

The process of Example 1 is repeated except that the following substitutions are made:

(a) The anodizing solution now is oxalic acid—15 gm./l. in water and is operated at 60° C. for 90 seconds with the aluminum base wire anodic to the cathode by 250 volts.

(b) The electroless Ni solution is replaced by the following electroless Cu solution using the operating conditions set forth:

| | |
|---|---|
| Rochelle salt ____ gm./l. | 100 |
| $CuSO_4 \cdot 5H_2O$ ____ gm./l. | 30 |
| NaOH ____ gm./l. | 40 |
| HCHO (37%) ____ ml./l. | 32 |
| $Na_2CO_3$ ____ gm./l. | 30 |
| Temperature ____ ° C. | 24 |
| Time ____ seconds | 420 |

(c) The electroplating Ni-Fe solution is replaced by the following solution and operating conditions:

| | |
|---|---|
| $NiSo_4 \cdot 6H_2O$ ____ gm./l. | 200 |
| $FeSo_4 \cdot 7H_2O$ ____ gm./l. | 3.5 |
| Sodium lauryl sulfate ____ gm./l. | 0.4 |
| $H_3BO_3$ ____ gm./l. | 25.0 |
| Sodium saccharin ____ gm./l. | 1.0 |
| pH ____ | 3.0 |
| Temperature ____ ° C. | 30 |
| Current density ____ ma./cm.$^2$ | 19 |
| Time ____ seconds | 270 |

*Example 3*

The process of Example 1 is repeated except that the following substitutions are made:

(a) The aqueous anodizing solution now is—

| | |
|---|---|
| Oxalic acid ____ gm./l. | 6.3 |
| $H_3BO_3$ ____ gm./l. | 14.4 |
| Borax ____ gm./l. | 2.0 |
| Temperature ____ ° C. | 70 |
| Time ____ seconds | 90 |
| Voltage ____ volts | 250 |

(b) The electroless Ni solution is replaced by the following electroless Cu solution using the operating conditions set forth:

| | |
|---|---|
| Rochelle salt ____ gm./l. | 100 |
| $CuSO_4 \cdot 5H_2O$ ____ gm./l. | 30 |
| NaOH ____ gm./l. | 40 |
| HCHO (37%) ____ ml./l. | 32 |
| $Na_2CO_3$ ____ gm./l. | 30 |
| Temperature ____ ° C. | 24 |
| Time ____ seconds | 420 |

(c) The electroplating Ni-Fe solution is replaced by the following solution and operating conditions:

| | |
|---|---|
| $NiCl_2 \cdot 6H_2O$ ____ gm./l. | 200 |
| $FeCl_2 \cdot 4H_2O$ ____ gm./l. | 3.5 |
| $H_3BO_3$ ____ gm./l. | 25.0 |
| Sodium lauryl sulfate ____ gm./l. | 0.42 |
| Sodium saccharin ____ gm./l. | 1.0 |
| pH ____ | 3.0 |
| Temperature ____ ° C. | 25 |
| Current density ____ ma./cm.$^2$ | 20 |
| Time ____ seconds | 270 |

The cylindrical magnetic thin film element obtained from the fabrication process of the invention has circumferential orientation of the easy magnetic axis and can be used to store binary digital data such as, for example, in a manner described by H. E. Haber et al. in U.S. Patent No. 3,031,648, supra.

Figure 2:
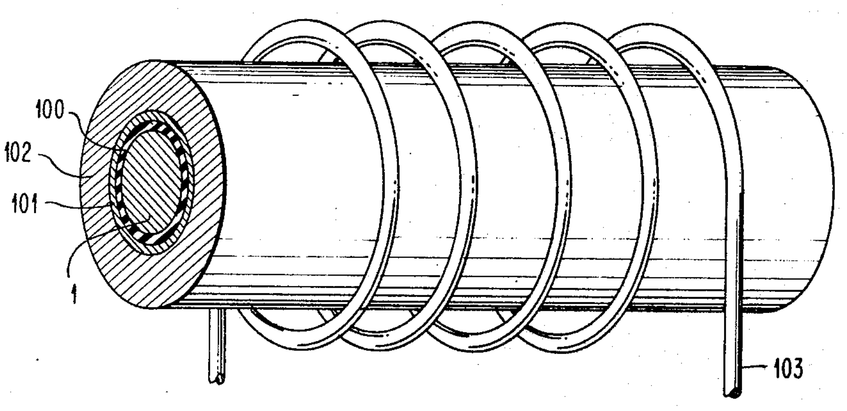
FIG. 2 is a perspective view of a magnetic thin film or memory logic element.

The advantage of this element is in the uniformity of the magnetic material provided by this process. This improved uniformity is obtained by the use of separate conductors to carry the plating current and the current to produce the orienting field. In adapting the binary characteristics of the device shown in FIG. 2 to the use shown by Haber et al., the central conductor 1 (FIG. 2) is equivalent to the central conductor 10 of Haber et al.'s FIG. 1, and winding 103 (FIG. 2) is equivalent to any Haber et al.'s FIG. 1 windings 13 to 15. The element shown in FIG. 2 comprises a central aluminum conductor 1, a high dielectric anodic film 100, an electrolessly deposited electrically conductive nonferromagnetic film 101, and a nonmagnetostrictive Ni-Fe magnetic film 102. A conducting wire 103 is helically wound around the element.

Figure 3:
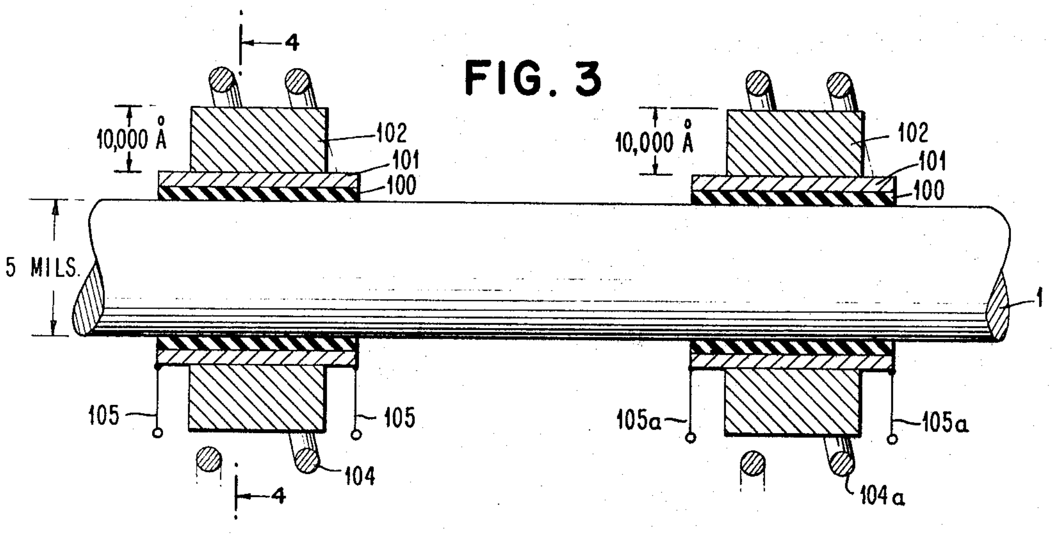
FIG. 3 is a schematic representation of a series of magnetic thin film elements on a common conductor with electrical contacts being made to the electrolessly deposited electrically conductive nonferromagnetic film for each element.
Figure 4:
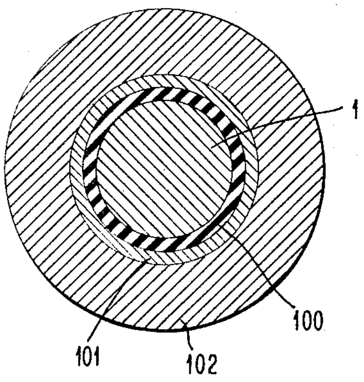
FIG. 4 is a cross-sectional view along line 4—4 of FIG. 3.

However, use can be made of the cylindrical, electrolessly deposited, electrically conducting nonferromagnetic film when the cylindrical magnetic thin film element is operated as a memory device such as, for example, in FIG. 3. The memory device of FIG. 3 when employed in a matrix memory (such as that shown in the book "Digital Computer Components and Circuits" by R. K. Richards (1957—D. Van Nostrand Co., Inc., New York, N.Y.—chapter 8, page 355)) comprises the central aluminum conductor 1, used as a half select drive line (X winding) to switch the magnetic film 102 coincident with an orthogonal half select field supplied from a helically wrapped wire conductor 104 or 104*a* (Y winding). The electrolessly deposited conductor 101 is used as a sense (or inhibit) line and is insulated from the drive line 1 by the high dielectric anodic film 100. In order to make separate electrical contacts to the sense line 101 by 105 or 105*a*, the films are masked and etched by standard techniques to obtain the geometry shown in FIG. 3. FIG. 3 shows the removal of the high dielectric anodic film from the aluminum base conductor between elements. However, the device can operate in the same manner when the high dielectric film is retained on the aluminum base wire. FIG. 4 is a cross section along line 4—4 of FIG. 3, and shows the placement of the cylindrical films about the central aluminum conductor.

The circumferentially oriented magnetic member is produced from the aluminum base wire by cleaning said aluminum base wire in an aluminum alkaline soak cleaner followed by anodizing the surface of said aluminum base wire to form a continuous, dense, and pore-free high dielectric and insulating anodic film; thereafter sensitizing said high dielectric anodic film by immersing into a stannous chloride acid solution followed by an acid solution of palladium chloride and subsequently coated autocatalytically with an electrically conductive nonferromagnetic substrate film; finally having electroplated onto the electrolessly deposited electrically conductive, nonferromagnetic substrate a nickel-iron magnetic film about 10,000 A. thick with the easy axis of magnetization oriented circumferentially under the influence of a field produced by passing a current along the aluminum base wire. All of the processing steps delineated above are followed by adequate running water rinses and finally the finished magnetic member is dried, before winding onto the take-up reel. The magnetic member referred to above may be converted to a single magnetic element by winding a helical coil about said member. Further, a series of said elements sharing the same electrically insulated central conductor may be produced by selectively etching away portions of coatings 100, 101, and 102 to give the configuration depicted in FIG. 3. Separate electrical connections are made to each of the remaining toroidal structures and separate sense coils are helically wound about each element to produce a plurality of magnetic elements with the easy axis of magnetization circumferentially oriented, all sharing a common central aluminum conductor.

While the invention has been particularly shown and described with reference to preferred embodiments thereof, it will be understood by those skilled in the art that various changes in form and details may be made therein without departing from the spirit and scope of the invention.

What is claimed is:

1. As an article of manufacture a unitary cylindrical, plated wire structure comprising:
(a) a cylindrical core of electrically conductive material;
(b) a concentric cladding of a high dielectric adherent material intimately surrounding said core;
(c) a concentric cylindrical coating of an electrically conducting nonferromagnetic material coated on said adherent material; and
(d) an outer sheath of magnetic material surrounding said electrically conducting nonferromagnetic material

2. As an article of manufacture, a cylindrical, plated wire structure comprising:
(a) a cylindrical core of electrically conductive material;
(b) a concentric cladding of a high dielectric adherent material intimately surrounding said core;

(c) a concentric cylindrical coating of an electrolessly deposited electrically conducting nonferromagnetic material; and
(d) an outer sheath of nonmagnetostrictive magnetic material surrounding said electrolessly deposited electrically conducting nonferromagnetic material.

3. As an article of manufacture, a cylindrical, plated wire structure comprising:
(a) a cylindrical core of aluminum;
(b) a concentric cladding of a high dielectric anodic adherent film intimately surrounding said cylindrical core of aluminum;
(c) a concentric cylindrical coating of an electrolessly deposited electrically conducting nonferromagnetic material selected from the group consisting of nickel, copper and gold; and
(d) an outer sheath of magnetic nonmagnetostrictive Ni-Fe film electroplated onto said electrolessly deposited film.

4. The article of manufacture of claim 3 wherein the cylindrical core of aluminum has a diameter of approximately 5–20 mils and wherein said high dielectric anodic film is produced by making said cylindrical core of aluminum anode in an anodizing electrolyte.

5. As an article of manufacture, a cylindrical, plated wire structure comprising:
(a) an aluminum base wire having a diameter of approximately 5–20 mils;
(b) a concentric high dielectric adherent anodically formed film cladded on said base wire;
(c) an electrolessly deposited electrically conductive nonferromagnetic nickel film cladded on said high dielectric anode film; and
(d) an outer concentric nonmagnetostrictive magnetic Ni-Fe film having a thickness of approximately 10,000 to 25,000 A. with a circumferentially oriented easy axis of magnetization on said electrolessly deposited nickel film.

6. The article of manufacture of claim 5 wherein said electrolessly deposited electrically conductive nonferromagnetic film is copper.

References Cited

UNITED STATES PATENTS

| | | | |
|---|---|---|---|
| 2,854,640 | 9/1958 | Nordlin | 340—174 |
| 3,055,770 | 9/1962 | Sankuer et al. | 340—174 X |
| 3,240,686 | 3/1966 | Towner | 340—174 X |
| 3,243,734 | 3/1966 | Bartik | 340—174 X |
| 3,264,619 | 8/1966 | Riseman | 340—174 |
| 3,275,839 | 9/1966 | Bartik | 307—88 |

BERNARD KONICK, *Primary Examiner.*

S. M. URNYOWICZ, *Assistant Examiner.*